No. 801,971. PATENTED OCT. 17, 1905.
C. E. CURTISS.
BAND CUTTER AND FEEDER.
APPLICATION FILED SEPT. 3, 1903.
4 SHEETS—SHEET 4.
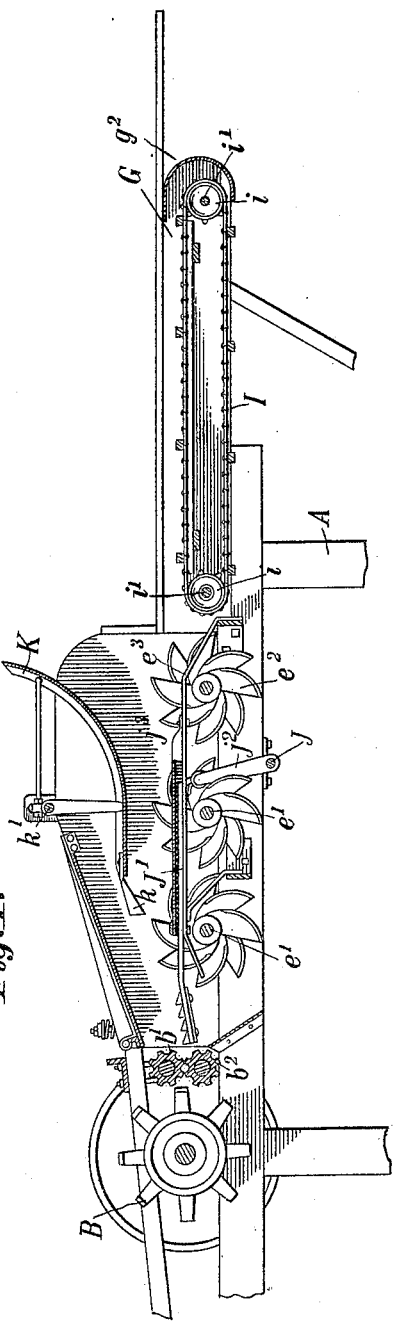
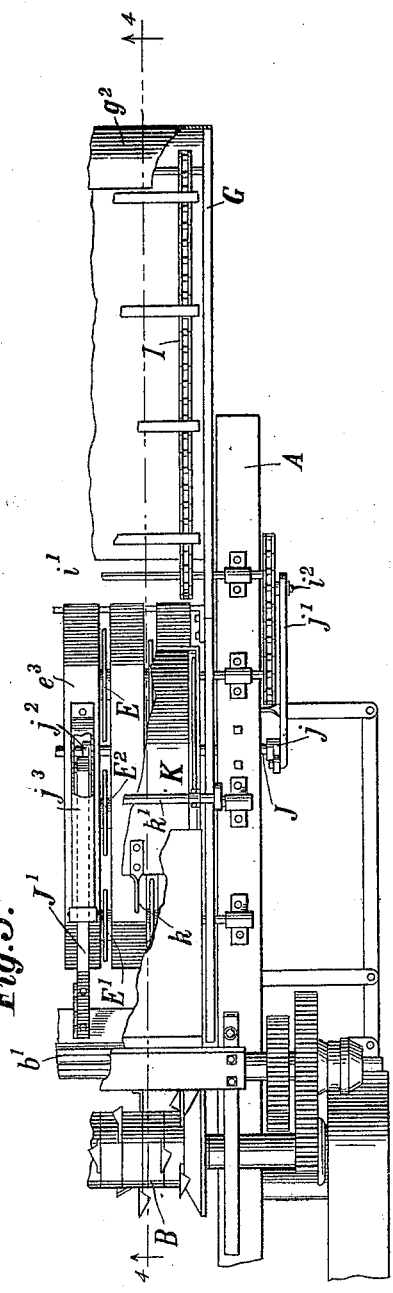
WITNESSES:
INVENTOR.
Charles E. Curtiss.
BY
ATTORNEY.

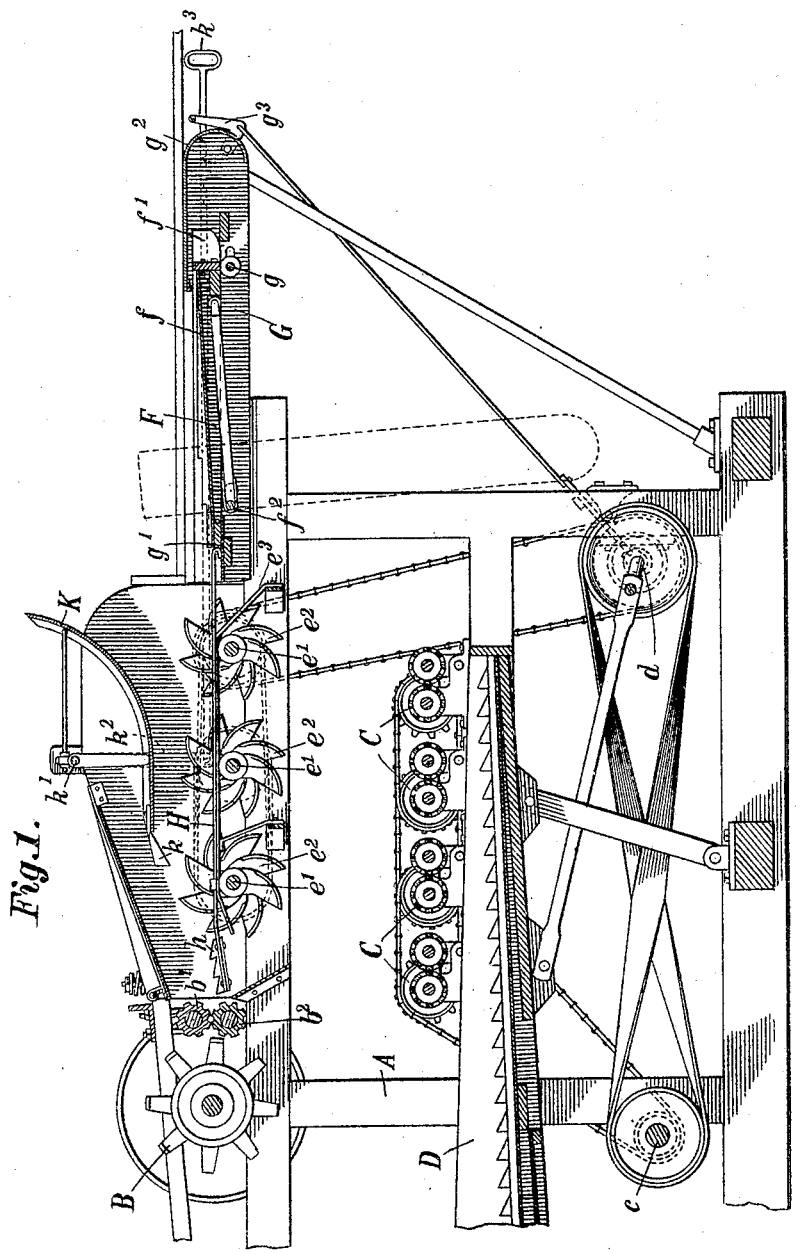

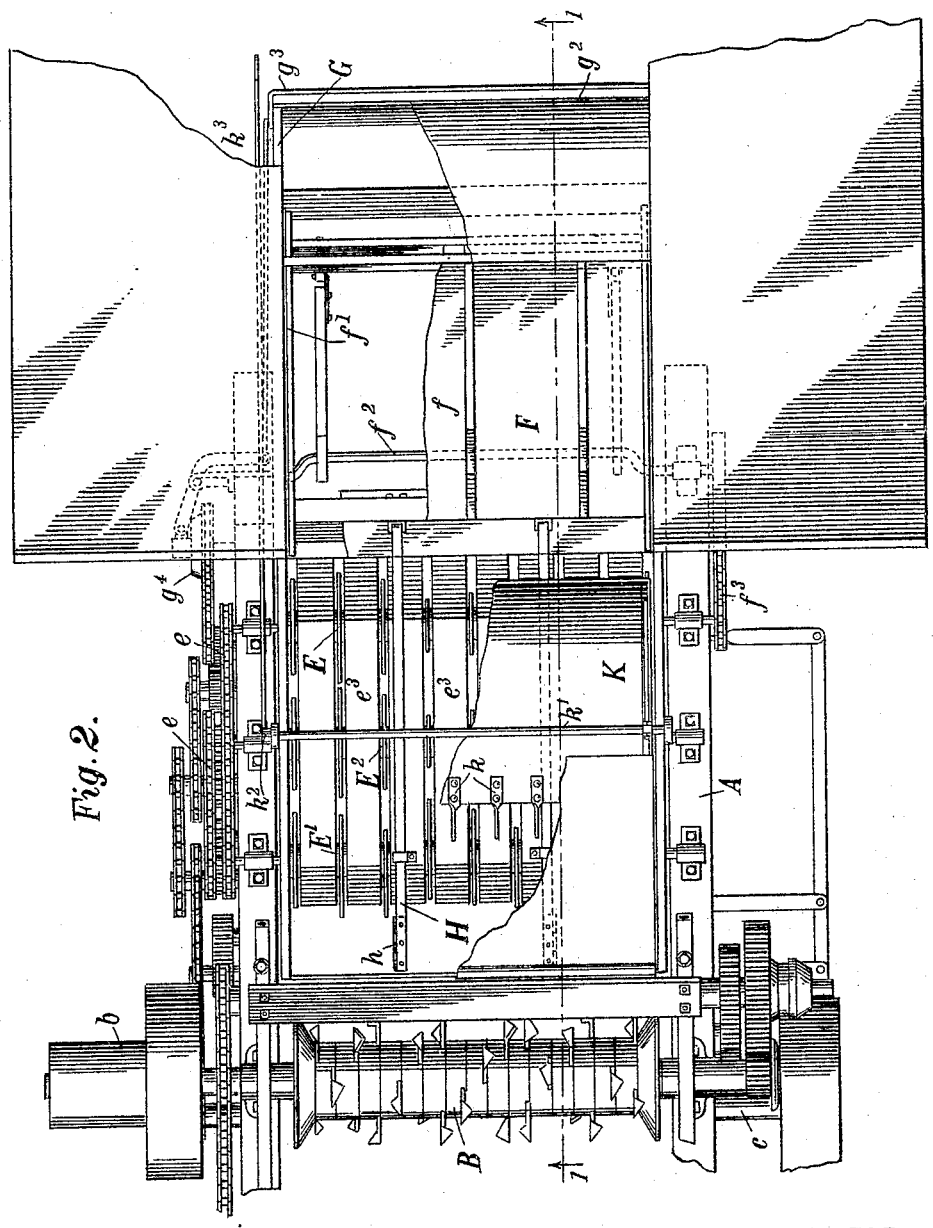

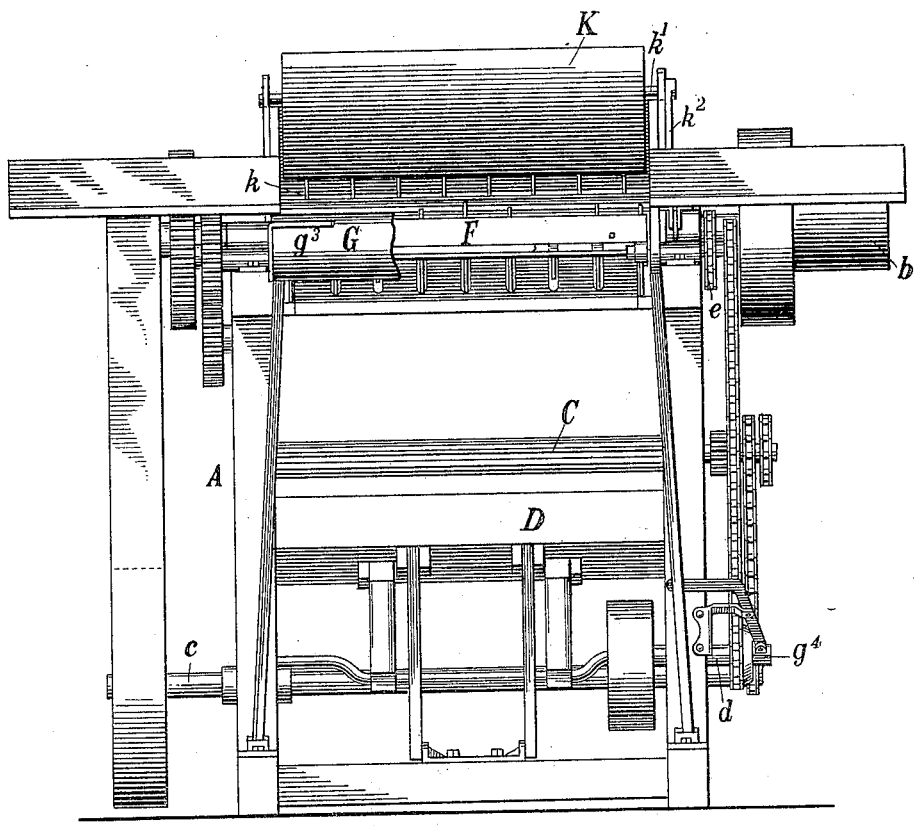

UNITED STATES PATENT OFFICE.

CHARLES E. CURTISS, OF CHICAGO, ILLINOIS, ASSIGNOR TO INTERNATIONAL HARVESTER COMPANY, OF CHICAGO, ILLINOIS, A CORPORATION OF NEW JERSEY.

BAND CUTTER AND FEEDER.

No. 801,971.   Specification of Letters Patent.   Patented Oct. 17, 1905.

Application filed September 3, 1903. Serial No. 171,846.

*To all whom it may concern:*

Be it known that I, CHARLES E. CURTISS, a citizen of the United States, residing at Chicago, in the county of Cook and State of Illinois, have invented certain new and useful Improvements in Band-Cutters and Feeders for Corn Huskers and Shredders, of which the following is a specification sufficiently clear and exact to enable those skilled in the art to which it appertains to make and use the same.

The invention relates in general to husking and shredding machines, and in particular to band-cutters and feeders therefor.

It has for its object to provide a feeder the main stalk-forwarding mechanism of which shall operate at the same time as a band-cutter, a spreader, and a clearer for the throat or ear passage-way in front of the feeding and snapping rolls, to provide an auxiliary stalk-forwarding device which shall effectively conduct the stalks, especially the broken and short ones, across the throat and still allow the ears to pass through, and to provide an adjustable stalk-retarding device above the feeding mechanism for retarding the upper portion of a mass of stalks which is in excess of the capacity of the machine.

Objections to feeders for corn husking and shredding machines heretofore made have been that when corn which is bound into bundles is to be operated upon the band-cutting devices are not positive in their operation, permitting a whole bundle to be forwarded in one mass, causing the machine to slug and choke; that when the bands of the bundles are severed the stalks are not properly spread, so that they may be forwarded to the snapping-rolls and subsequently to the shredder-head in a continuous uniform mass; that the throat or ear passage-way in front of the feeding and snapping rolls is not properly cleared so as to prevent choking; that broken or short stalks and leaves pass through the throat with the ears, overtaxing the husking-rolls and interfering with their efficiency; that a mass of stalks in excess of the capacity of the machine is forwarded, causing it to choke.

The feeder herein shown very effectively overcomes all the objections above recited.

An embodiment of the invention is shown in the accompanying drawings, forming a part of this specification, in which like characters of reference designate like parts throughout the several views.

Referring to the drawings, Figure 1 is a longitudinal sectional elevation taken on a plane indicated by line 1 1 of Fig. 2, showing as much of a corn husking and shredding machine as is necessary to show the application of the invention. Fig. 2 is a plan view of the parts shown in Fig. 1, a portion of which is fragmentary. Fig. 3 is an end elevation of the parts shown in Figs. 1 and 2, showing a portion of the shield $g^2$ broken away. Fig. 4 is a view corresponding to Fig. 1, showing an alternative construction. Fig. 5 is a partial plan view of the alternative construction shown in Fig. 4.

The framework of the machine is designated by A. Mounted in suitable journals upon the framework is the shredder-head B, which is adapted to be driven from any source of power by the pulley $b$. Journaled immediately in front of the shredder-head are the feeding and snapping rolls $b'$ and $b^2$. Below and in front of the feeding and snapping rolls are a plurality of husking-rolls C, which are arranged transversely of the machine, and immediately below the husking-rolls is the shaker D. The construction and operation of the parts so far referred to are clearly set forth in my Patent No. 727,300, issued May 5, 1903, and since they form no part of the present invention need not be described here.

The feeder is located upon the framework in the usual position in front of the feeding and snapping rolls and above the husking-rolls. It consists of a conveyer, a main feeding mechanism, and an auxiliary forwarding device, all of which receive their motion from the main driving-shaft, on which the shredder-head is mounted, through the intermediacy of the shaft $c$, the shaft $d$, and suitable connecting means. The main feeding mechanism consists of a plurality of cutter-heads E, E', and $E^2$, which are journaled in suitable bearings and connected together by driving-belts $e$. These cutter-heads are formed of a plurality of knives $e^2$, secured to a shaft $e'$, spaced a suitable distance apart and arranged about the shaft at suitable angles relative to each other. The forward edges of the knives are rounded or inclined to the rear relative to their direction of rotation and are sharpened along these edges. Secured to the framework is a plurality of strips or plates $e^3$, which lie over the central portion of the cutter-heads and between the knives, forming the floor of the feeder, which is substantially on a line with the line of contact of the snapping-rolls. The foremost cutter-head E is primarily a band-cutter, and the rearmost E' a clearing-cutter for the throat B' between it and the snapping-rolls. They also serve as stalk-forwarding means. The intermediate or third cutter-head $E^2$ is located between these two and serves to spread the stalks, to assist in forwarding them, and to make doubly positive the severing of the bands. The front cutter-head or band-cutter E is preferably made slightly larger than the other two and is driven at a little higher rate of speed. This insures a greater relative movement between the knives and the stalks. A greater number of intermediate cutter-heads might be provided, if found necessary; but it is thought that one will meet all ordinary requirements. In front of this main feeding mechanism is located a conveyer F, which, as shown in Figs. 1 and 2, consists of an inclined plate $f$, provided with longitudinal notched ribs, which is carried by the frame $f'$ and adapted to be reciprocated by a crank-shaft $f^2$, which is driven by the main feeding mechanism through the intermediacy of suitable sprockets and the chain $f^3$. This conveyer is mounted in the support G, which is preferably pivoted so that it can be adjusted in height to suit the operator and be folded down, as shown in dotted lines in Fig. 1, for transportation, the front end of the conveyer being supported upon antifriction-rollers $g$ and the rear end on a transverse bar $g'$. A shield $g^2$ covers the front edge of the support G and extends over the front edge of the conveyer. Pivoted to the support is a bail-like lever $g^3$, the bail of which extends across the end immediately in front of the shield $g^2$, where it is in position for the body of the operator to come in contact with. This lever is connected with a safety-clutch $g^4$, whereby the feeding mechanism may be thrown out of gear and stopped whenever the operator is near enough to endanger any of his members coming in contact with the rotating cutter-heads.

Pivoted to the rear edge of the conveyer F is one or more bars H, which lie upon the floor of the feeder and extend across the throat B' and form the auxiliary forwarding device above referred to. The rearmost ends of these bars are provided with a notched member $h$, which is adapted to engage and forward the stalks. These bars, extending across the throat, serve to support and convey to the feeding and snapping rolls any broken or short stalks which would otherwise pass through to the husking-rolls and interfere with their efficiency and yet permit the ears to pass through without serious obstruction. Such a forwarding device is especially necessary when a feeder is used which is provided with band-cutting or other knives, as the stalks are more or less cut up by them.

An alternative and a preferable construction of the feeder and auxiliary forwarding device is shown in Figs. 4 and 5. The conveyer I therein shown is of the slatted-belt type, which is carried by sprocket-wheels $i$ on shafts $i'$, journaled in a support G, which are driven by the main feeding mechanism in the same manner that the crank-shaft $f^2$ of the conveyer F is driven. A rock-shaft J is mounted upon the main frame, preferably below and between the two forward cutter-heads, to which is secured a rocker-arm $j$, which is connected by a link $j'$ to a wrist-pin $i^2$. Rocker-arms $j^2$ are also secured to this rock-shaft and are pivotally connected to the reciprocating arms J', which form the auxiliary forwarding device and which perform identically the same function that the arms H perform. Certain of the plates $e^3$ are provided with holes, through which the forward end of the arms J' are inserted to permit their connection with the rocker-arms $j^2$. Over the forward end of these reciprocating arms is secured a channel-shaped shield $j^3$, which serves to hold the arms in proper alinement and to prevent their engaging the stalks on their return movement, which would interfere with the feeding of the same.

Pivotally mounted above the main feeding mechanism is a shield or deflecter K, which is provided at its rear lower edge with a plurality of fingers $k$, which are adapted to engage the upper portion of the mass of stalks being fed. In case there is a greater quantity of such stalks than the machine is capable of disposing of these fingers retard the upper portion of the mass until the lower portion has been forwarded by the feeder. The shaft $k'$, upon which this deflector is mounted, has an arm $k^2$ secured to it outside of the feeder, which arm is provided with a connecting-rod $k^3$, which is provided with a handle and means for engaging it with some relatively stationary part, as the support G, which means permits its adjustment. By the means above described the retarding-fingers $k$ may be brought into close proximity with the cutter-heads or be raised away from them or may be worked back and forth to loosen up any lodged matter by the operator without his leaving his position in front of the feeder.

From the foregoing description the operation of the invention, it is thought, will be understood without further explanation. A bundle (or in case the corn is unbound a mass) of stalks is drawn by one or more operators onto the conveyer from the tables on either side which are supplied by assistants. They are advanced by the conveyer to the main feeding mechanism, where the bands are cut, if there are any, the stalks spread out and forwarded to the snapping-rolls, and thence to the shredder-head. In case a mass in excess of the capacity of the machine is advanced to the feeder the retarding-deflector engages the upper portion and holds it back until the lower portion is forwarded. In case there is any tendency to clog the throat at the entrance of the snapping-rolls, which would prevent the ears passing to the husking-rolls, it is effectively prevented by the clearing-cutter. Broken or short stalks and leaves which would otherwise pass through the throat are conveyed across to the snapping-rolls to be shredded in the proper manner, thus preventing the overtaxing of the husking-rolls.

Having thus described my invention, what I claim as new, and desire to secure by Letters Patent, is—

1. In a feeder for corn-huskers, the combination with the snapping-rolls, of a rotary forwarding and clearing cylinder and a reciprocating stalk supporting and forwarding device between said rolls and cylinder having openings for the ears to pass through.

2. In a feeder for corn huskers and shredders, in combination with the shredder-head, the snapping-rolls, and the husking-rolls, a rotary forwarding and clearing cutter-head armed with a plurality of knives located in front of said snapping-rolls, means for conveying the stalks to said cutter-head, and one or more reciprocating stalk supporting and forwarding arms lying between the knives of said cutter-head, their working portion spanning the space between said snapping-rolls and cutter-head.

3. In a feeder for corn-huskers, the combination with the snapping-rolls, of a main feeding mechanism having a movable clearing-cutter at the rear thereof and an auxiliary forwarding device formed of one or more reciprocating arms the working portion of which spans the space between said rolls and mechanism.

4. In a feeder for corn-huskers, the combination with the snapping-rolls, of a main feeding mechanism formed of a plurality of rotating cylinders and an auxiliary forwarding device formed of one or more reciprocating arms on a line with the line of contact of said rolls, the working portion of which arms spans the space between said rolls and mechanism.

5. In a feeder for corn huskers and shredders in combination with the shredder-head, the snapping-rolls, and the husking-rolls, a perforated floor substantially on a line with the line of contact of said rolls, a main feeding mechanism, formed of a plurality of cutter-heads each armed with a plurality of knives, journaled below said floor, the knives passing through the perforations therein, and an auxiliary supporting and forwarding device formed of a plurality of reciprocating arms which lie upon said floor between the knives, the working portions of which arms span the space between said snapping-rolls and mechanism.

6. In a band-cutter and feeder for corn-huskers, the combination with the snapping-rolls, of a rotary band-cutter, a stalk spreading and forwarding mechanism beyond, and one or more reciprocating stalk supporting and forwarding arms which span the space between said rolls and mechanism.

7. In a band-cutter and feeder for corn huskers and shredders in combination with the shredder-head, the snapping-rolls and the husking-rolls, a band-cutter formed of a rotating cylinder armed with a plurality of knives, a conveyer in front of said band-cutter, a rotary forwarding and clearing cylinder beyond said band-cutter, forwarding and spreading mechanism between said band-cutter and cylinder, one or more reciprocating arms, the working portions of which span the space between said cylinder and said snapping-rolls, and a connection between said conveyer and arms for operating the latter.

8. In a feeder for corn-huskers, the combination with the snapping-rolls, of a main feeding mechanism formed of a plurality of rotating cylinders, a retarding-deflector located above said mechanism, a conveyer located in front of said mechanism, and one or more reciprocating arms which span the space between said rolls and mechanism.

9. In a band-cutter and feeder for corn huskers and shredders in combination with the shredder-head, the snapping-rolls and the husking-rolls, a main feeding mechanism formed of a plurality of cutter-heads, one or more of which serve as band-cutters, a conveyer located in front of said mechanism, a retarding-deflector pivoted above said mechanism, a lever for operating said deflector and holding it in any desired position, and one or more reciprocating arms which span the space between said snapping-rolls and mechanism.

10. In a band-cutter and feeder for corn huskers and shredders in combination with the shredder-head, the snapping-rolls and the husking-rolls, a perforated floor substantially on a line with the line of contact of said snapping-rolls, a main feeding mechanism formed of a plurality of cutter-heads, each armed with a plurality of knives, journaled below said floor, the knives passing through the perforations therein, one or more of which cutter-heads serve as band-cutters and one as a clearing-cutter, a deflector pivotally mounted above said mechanism having retarding-fingers along the lower rear edge, a lever for operating said deflector and holding it in any desired position, a conveyer located in front of said mechanism, an auxiliary forwarding device formed of a plurality of reciprocating arms lying upon said floor, the working portions of which span the space between said snapping-rolls and mechanism, and a connection between said forwarding device and said conveyer for reciprocating the same.

11. In a feeder for corn huskers and shredders in combination with the shredder-head, the snapping-rolls and the husking-rolls, a main feeding mechanism formed of a plurality of cutter-heads, a conveyer located in front of said mechanism, a retarding-deflector pivoted above said mechanism, a lever for operating said deflector and holding it in any desired position.

12. In a band-cutter and feeder for corn huskers and shredders in combination with the shredder-head, the snapping-rolls and the husking-rolls, a main feeding mechanism formed of a plurality of cutter-heads, one or more of which serve as band-cutters, a conveyer located in front of said mechanism, a deflector pivoted above said mechanism having retarding-fingers along the lower rear edge, and a lever for operating said deflector and holding it in any desired position.

In testimony whereof I have signed my name to this specification in the presence of two subscribing witnesses.

CHARLES E. CURTISS.

Witnesses:
WILLIAM WEBBER,
JOHN R. MAYESKIE.